United States Patent

Feehrer et al.

(10) Patent No.: US 10,296,356 B2
(45) Date of Patent: May 21, 2019

(54) IMPLEMENTATION OF RESET FUNCTIONS IN AN SOC VIRTUALIZED DEVICE

(71) Applicant: Oracle International Corporation, Redwood City, CA (US)

(72) Inventors: John R. Feehrer, Westford, MA (US); Sriram Jayakumar, Lexington, MA (US); Rahoul Puri, Los Altos, CA (US); Matthew Cohen, Cambridge, MA (US); Julia Harper, Arlington, MA (US); Alan Adamson, San Diego, CA (US); John Johnson, San Jose, CA (US)

(73) Assignee: Oracle International Corporations, Redwood Shores, CA (US)

( * ) Notice: Subject to any disclaimer, the term of this patent is extended or adjusted under 35 U.S.C. 154(b) by 95 days.

(21) Appl. No.: 14/944,893

(22) Filed: Nov. 18, 2015

(65) Prior Publication Data

US 2017/0139721 A1    May 18, 2017

(51) Int. Cl.
*G06F 11/00* (2006.01)
*G06F 9/4401* (2018.01)
*G06F 13/20* (2006.01)

(52) U.S. Cl.
CPC ............ *G06F 9/4418* (2013.01); *G06F 13/20* (2013.01)

(58) Field of Classification Search
CPC . G06F 11/1417; G06F 11/1441; G06F 9/4418
See application file for complete search history.

(56) References Cited

U.S. PATENT DOCUMENTS

| | | | |
|---|---|---|---|
| 6,370,644 B1 * | 4/2002 | LaBerge | G06F 13/423 710/106 |
| 7,003,617 B2 * | 2/2006 | Golasky | G06F 13/4027 709/208 |
| 7,890,812 B2 * | 2/2011 | Kitahara | G06F 11/0745 714/44 |
| 8,176,304 B2 | 5/2012 | Puri | |
| 8,312,461 B2 | 11/2012 | Watkins | |
| 8,954,788 B2 * | 2/2015 | Abraham | G06F 13/102 714/4.5 |
| 2004/0167996 A1 | 8/2004 | Takamura | |
| 2008/0288661 A1 | 11/2008 | Galles | |
| 2009/0307702 A1 * | 12/2009 | Watkins | G06F 12/1441 718/104 |
| 2011/0289242 A1 * | 11/2011 | Srinivasan | G06F 13/102 710/22 |

(Continued)

*Primary Examiner* — Elmira Mehrmanesh
(74) *Attorney, Agent, or Firm* — Meyertons, Hood, Kivlin, Kowert & Goetzel, P.C.

(57) ABSTRACT

An apparatus and method for resetting a virtualized device are disclosed. The virtualized device may be coupled to a first port on a communication unit via a first link. The first port may send one or more instructions to the virtualized device via the first link using a first communication protocol. A processor may be configured to detect a reset condition for the virtualized device. In response to the detection of the reset condition for the virtualized device, the first port may disregard one or more transaction requests made by the virtualized device. The first port may further send an error message to the processor in response to receiving a Programmed Input/Output (PIO) request from the processor after the detection of the reset condition.

20 Claims, 6 Drawing Sheets

(56) References Cited

U.S. PATENT DOCUMENTS

2014/0237156 A1    8/2014  Regula
2015/0067217 A1*   3/2015  Feehrer ............... G06F 11/0793
                                                        710/263

* cited by examiner

_US 10,296,356 B2_

IMPLEMENTATION OF RESET FUNCTIONS IN AN SOC VIRTUALIZED DEVICE

BACKGROUND

Technical Field

This invention relates to computing systems, and more particularly, to techniques for implementing reset functions in an Input/Output (I/O) subsystem.

Description of the Related Art

Computing systems include multiple multi-threaded processors and devices, where each processor may send data to or receive data from a particular device. For example, the devices may include ethernet network interface cards (NICs) that allow the processors to communicate with other computing systems, and other devices either internal or external to the computing system such as printers or storage devices, for example.

Hardware resources associated with a particular device may be shared between various threads being executed by one or more of the multi-threaded processors. During operation, a given thread may execute one or more software instructions that request access, either a read or write, to a particular hardware resource of a given device. The computing system may format and transmit the access request to the particular hardware resource via a packetized serial communication link.

To manage access requests from the various threads, a device may include dedicated hardware to perform control and data functions within the device. In some cases, the dedicated hardware may include an embedded processor, or other suitable general-purpose processor, configured to execute multiple software instructions. In some computing systems, a device with shared hardware resources may be integrated into a System-on-a-Chip (SoC) along with one or more multi-threaded processors, for improved performance.

During operation, it may be desirable to reset a device. The desire to reset a particular device may be the result of the device generating errors, or a request to reallocate hardware resources of the device to a different execution thread.

SUMMARY OF THE EMBODIMENTS

Various embodiments of an apparatus and method for handling reset functions in a computing system are disclosed. Broadly speaking, a method and apparatus are contemplated in which a first device is coupled a first port of a communication unit via a first link. The first port may be configured to send one or more instructions for the first device via the first link using a first communication protocol. A processor may be configured to detect a reset condition for the first device. In response to the detection of the reset condition for the first device, the first port may be further configured to disregard one or more transaction requests made by the first device and send an error message to the processor in response to receiving a Programmed Input/Output (PIO) request from the processor.

In a non-limiting embodiment, the apparatus may include a reset control block. The reset control block may be configured to assert a reset signal and, in response to the assertion of the reset signal, the first device may be further configured to reset.

In one implementation, the first device includes at least one register. In order to reset in response to the assertion of the reset signal, the first device may be further configured to set the at least one register to a default value.

Figure 1:
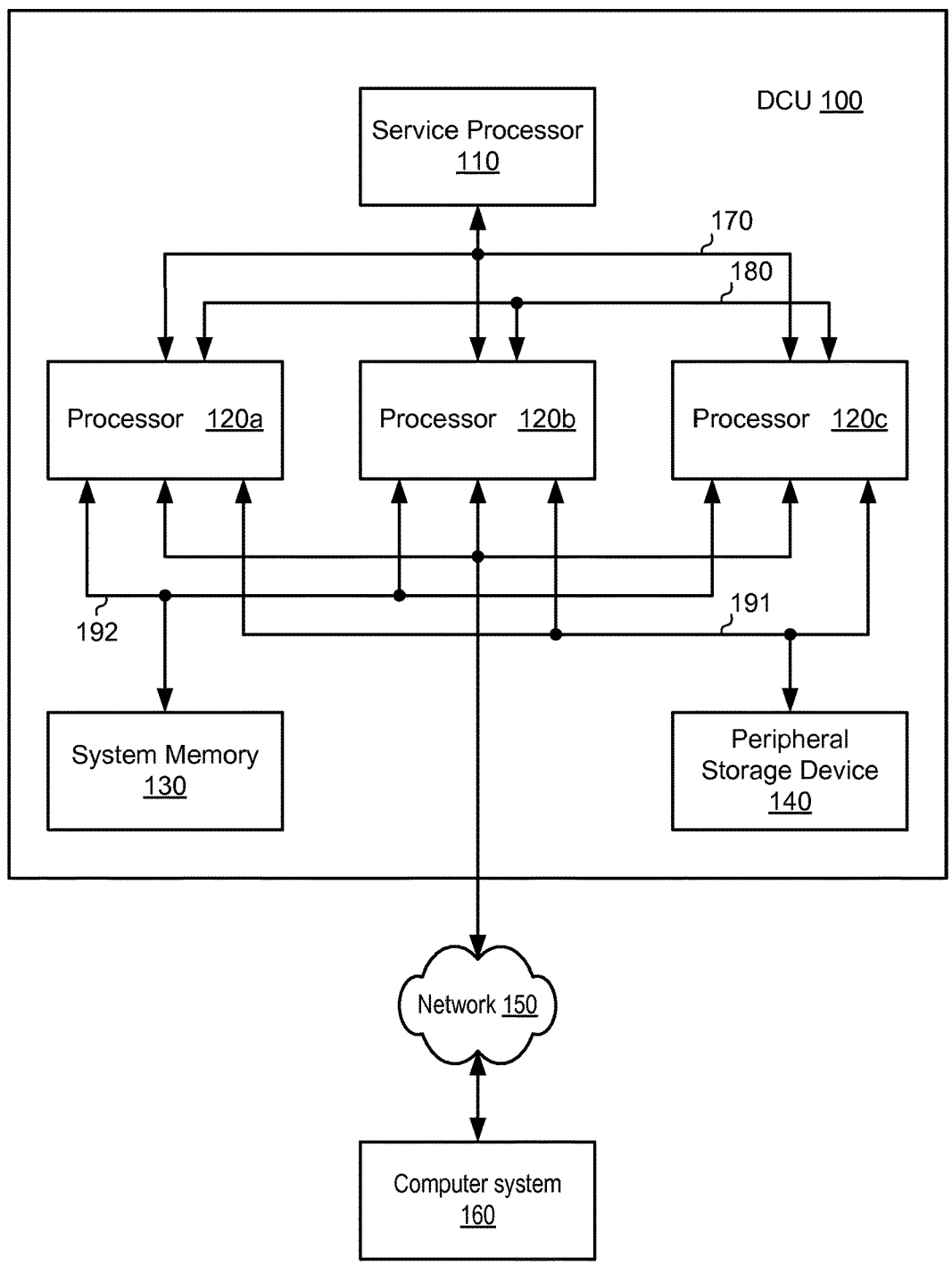
FIG. 1 is a block diagram of an embodiment of a distributed computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Multi-processor computing systems may support the use of one or more virtual machines, each running a respective Guest Operating System (GOS). Hardware resources, such as, e.g., an Input/Output (I/O) subsystem, may be shared between the various GOS instances. During operation of such multi-processor computing systems, there may be many requests generated by software programs executing within the GOSs to transfer data to, or retrieve data from peripheral storage devices or other computing systems.

I/O subsystems may include multiple ports coupled to a common communication hub. For example, some systems may employ multiple PCI-Express Root Ports coupled to a common Root Complex. Each Root Port may handle data transfers with a device. In some cases, the hardware resources of the device may be shared among different threads being executed by a processor or among multiple GOSs. Each of the shared hardware resources appear as a dedicated resource to the different GOSs and threads sharing the hardware resources. A device whose hardware resources are shared in this manner in commonly referred to as a "virtualized device."

On some integrated Systems-on-a-Chip (SoCs), a virtualized device may be included on a same integrated circuit as the SoC. In such cases, the virtualized device coupled to an I/O subsystem via a dedicated link (commonly referred to as a "virtual link"). The virtual link that connects these virtualized device and the I/O subsystem may mimic aspects of a communication protocol used to connect a processor or chipset to external plug-in I/O cards, such as PCI-Express, for example. Employing a virtual link in an integrated SoC may present difficulties during reset operations, as some functions included in a reset operation of the communication protocol may be difficult to implement in the virtual link necessitating increased silicon area and circuit complexity. The embodiments illustrated in the drawings and described below may provide techniques for performing reset operations for a virtualized device coupled to communication hub using a virtual link while reducing area, power consumption, and complexity.

A block diagram illustrating one embodiment of a distributed computing unit (DCU) 100 is shown in FIG. 1. In the illustrated embodiment, DCU 100 includes a service processor 110, coupled to a plurality of processors 120a-c through bus 170. It is noted that in some embodiments, processor 110 may additionally be coupled to system memory 130 through bus 170. Processors 120a-c are, in turn, coupled to system memory 130, and peripheral storage device 140. Processors 120a-c are further coupled to each other through bus 180 (also referred to herein as "coherent interconnect 180"). DCU 100 is coupled to a network 150, which is, in turn coupled to a computer system 160. In various embodiments, DCU 100 may be configured as a rack-mountable server system, a standalone system, or in any suitable form factor. In some embodiments, DCU 100 may be configured as a client system rather than a server system.

System memory 130 may include any suitable type of memory, such as Fully Buffered Dual Inline Memory Module (FB-DIMM), Double Data Rate, Double Data Rate 2, Double Data Rate 3, or Double Data Rate 4 Synchronous Dynamic Random Access Memory (DDR/DDR2/DDR3/DDR4 SDRAM), or Rambus® DRAM (RDRAM®), for example. It is noted that although one system memory is shown, in various embodiments, any suitable number of system memories may be employed. Each of processors 120a-c is coupled to system memory 130 via bus 192.

Storage device 140 may, in some embodiments, include magnetic, optical, or solid-state storage media such as hard drives, optical disks, non-volatile random-access memory devices, etc. In other embodiments, storage device 140 may include more complex storage devices such as disk arrays or storage area networks (SANs), which may be coupled to processors 120a-c via bus 191, which may implement a particular communication protocol, such as, a standard Small Computer System Interface (SCSI), a Fiber Channel interface, a Firewire® (IEEE 1394) interface, Peripheral Component Interface Express (PCIe), or another suitable interface. Additionally, it is contemplated that in other embodiments, any other suitable peripheral devices may be coupled to processors 120a-c, such as multi-media devices, graphics/display devices, standard input/output devices, etc.

As described in greater detail below, each of processors 120a-c may include one or more processor cores and cache memories. In some embodiments, each of processors 120a-c may be coupled to a corresponding system memory, while in other embodiments, processors 120a-c may share a common system memory. Processors 120a-c may be configured to work concurrently on a single computing task and may communicate with each other through coherent interconnect 180 to coordinate processing on that task. For example, a computing task may be divided into three parts and each part may be assigned to one of processors 120a-c. Alternatively, processors 120a-c may be configured to concurrently perform independent tasks that require little or no coordination among processors 120a-c.

The embodiment of the distributed computing system illustrated in FIG. 1 is one of several examples. In other embodiments, different numbers and configurations of components are possible and contemplated. It is noted that although FIG. 1 depicts a multi-processor system, the embodiments described herein may be employed with any number of processors, including a single processor.

The use of virtualized devices in a coomputing system, such as, e.g., DCU 100, to allow multiple guest operating system (GOS) instances to share hardware such that individual GOS instances are protected and isolated from each other. Through isolation of individual GOS instances, efficient use of a computing system's virtualized resources may be realized, while keeping the GOS instances from interfering with each other. For example, a fatal error or performance bottleneck in one GOS instance should not disrupt the operation of other GOS instances. The use of virtualization may, in various embodiments, allow for a lower cost of a computing system. For example, a datacenter may employ a single virtualized system as opposed to purchasing multiple servers, thereby lowering the overall cost of the computing system.

In particular, I/O subsystems, i.e., collections of circuit blocks configured to perform communication tasks with devices may also be virtualized, thereby allowing I/O devices such as a NIC or disk controller to be shared by multiple GOS instances. In order to virtualize an I/O device, reset operations must be communicated with the I/O device. As will be described below in more detail, certain protocols may be employed to reset operations to be performed on a virtualized I/O device.

Figure 2:
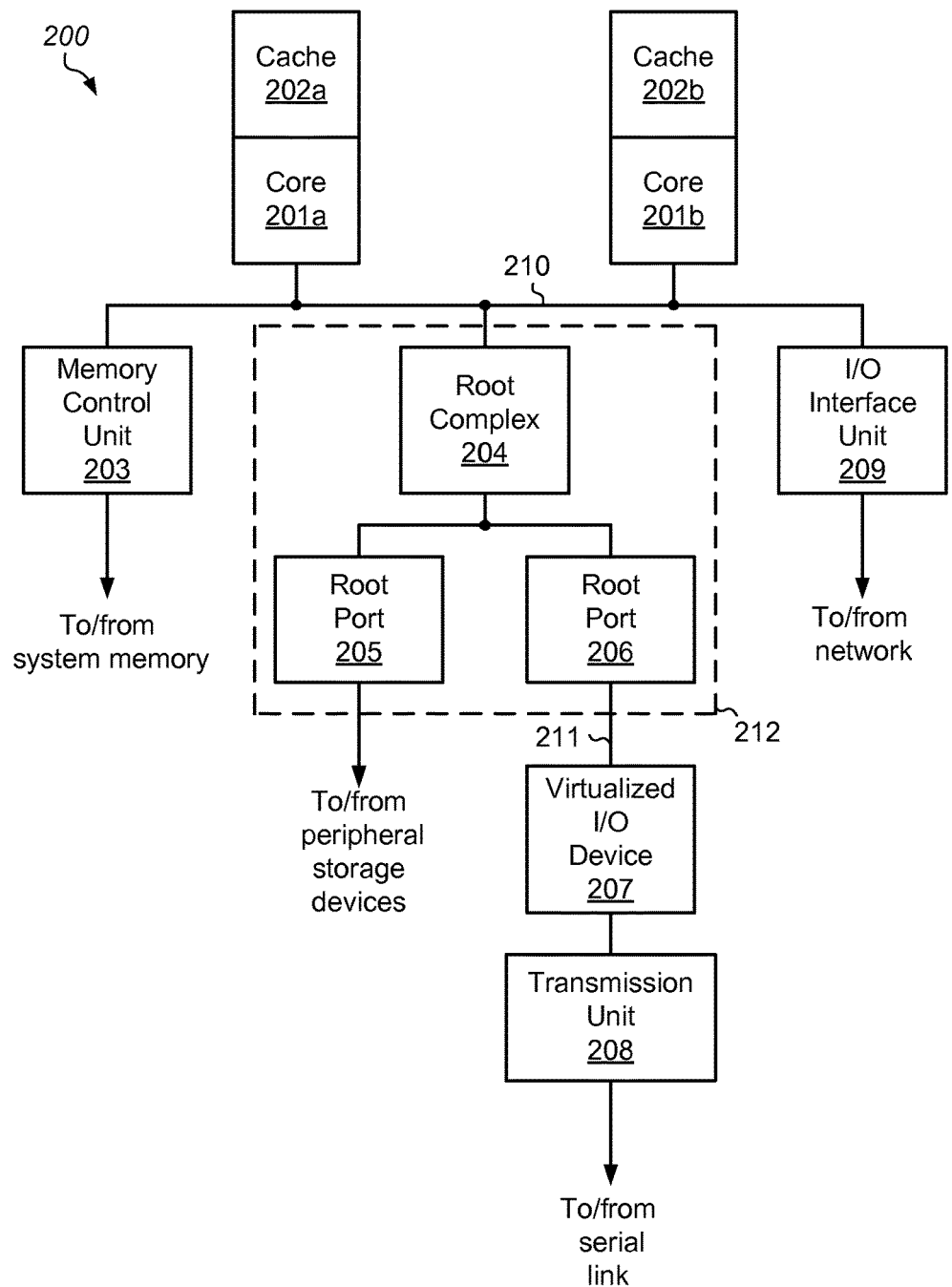
FIG. 2 is a block diagram of an embodiment of a processor.

A block diagram illustrating one embodiment of an SoC processor 200 is shown in FIG. 2. In some embodiments, processor 200 may correspond to processors 120a-c of DCU 100 in FIG. 1. In the illustrated embodiment, processor 200 includes processor cores 201a and 201b. It is noted that although two cores are shown, in various embodiments, any suitable number of processor cores may be employed. Each of cores 201a-b is coupled to a respective one of cache partitions 202a-b. Cores 201a-b are coupled to each other and to memory control unit 203, and communication unit 204 via on-chip network 210. On-chip network 210 may be a point-to-point network, ring-based network, or any other suitable network configuration that allows for communication between processor cores 201a-b, memory interface 203 and communication unit 212. In some embodiments, on-chip network 210 may include a multi-wire parallel bus, and requests and responses between the various devices may be transmitted via the multi-wire parallel bus using an suitable communication protocol.

Cores 201a-b may be configured to execute instructions and to process data according to a particular instruction set architecture (ISA). In one embodiment, cores 201a-b may be configured to implement the SPARC® V9 ISA, although in other embodiments it is contemplated that any desired ISA may be employed, such as x86, PowerPC® or MIPS®, for example. In the illustrated embodiment, each of cores 201a-b may be configured to operate independently of the others, such that all cores 201a-b may execute in parallel. Additionally, in some embodiments each of cores 201a-b may be configured to execute multiple execution threads (or simply "threads") concurrently, where a given thread may include a set of instructions that may execute independently of instructions from another thread. (For example, an individual software process, such as an application, may consist of one or more threads that may be scheduled for execution by an operating system.) A core capable of executing multiple execution threads may be referred to as a multithreaded (MT) core.

Cache memory partitions 202a-b may, in various embodiments, collectively form a level 3 (L3) cache memory for processor 200. The multiple cache memory partitions need to maintain coherency with respect to each other. Cache memory partitions 202a-h may, in various embodiments, implement one of numerous coherency protocols, such as, e.g., MOESI, MESI, or any suitable cache coherency protocol.

Each of cache memory partitions 202a-b may be configured to cache instructions and data for use by cores 201a-b. In the illustrated embodiment, each of cache memory partitions 202a-b may be separately addressable and independently accessed, may concurrently return data to a respective core of cores 201a-b. In some embodiments, each individual cache memory partition may be implemented using set-associative or direct-mapped techniques. For example, in one embodiment, each of cache memory partitions 202a-h may be a 8 megabyte (MB) cache, although other cache sizes and organizations are possible and contemplated Memory interface 203 may be configured to manage the transfer of data between cache partitions 202a-b and system memory in response to fill requests and data evictions. Memory interface 203 may be configured to interface to any suitable type of system memory, such as described above in reference to FIG. 1 In some embodiments, memory interface 203 may be configured to support interfacing to multiple different types of system memory.

Communication unit 212 includes a PCIe Root Complex 204 and Root Ports 205 and 206, and may be configured to transfer data between processor 200 and other devices. It is noted that although a single Root Complex and two Root Ports are shown in the present embodiment, other embodiments may include any quitable number of Root Complexes and Ports. PCIe Root Complex 204 may, in various embodiments, be configured to relay requests and responses (collectively "transactions") between processor 200 and devices couple to Root Ports 205 and 206. Since transactions may be formatted differently on on-chip network 210 than what the aformentioned devices are capable of receiving, PCIe Root Complex 204 may translate the transactions from the communication protocol of on-chip network 210 to a communication protocol compatible with a device coupled to one of Root Ports 205 and 206. The translation of a transaction may include the translation of an addresses from the address space of processor 200 to a device address space, as well as the conversion of multi-bit data words into data packets to be transmitted in a serial fashion. It is noted that in the present embodiment, communication unit 212 includes circuit blocks specific to the PCIe communication protocol as a particular example to aid in explanation. In other embodiments, any suitable communication protocol may be employed, such as, Peripheral Component Interface (PCI) and Accelerated Graphics Port (AGP), for example.

Each of Root Ports 205 and 206 may be configured to relay a translated transaction to a particular device in accordance with a particular communication protocol. In some embodiments, Root Port 205 may be configured to relay a translated transaction to a device. In various embodiments, Root Port 205 may transmit the translated transaction to the device using one of various communication protocols, such as the PCIe communication protocol, for example. Such transactions may be sent outside of integrated circuit chip 213.

Root port 206 is coupled to virtualized I/O device 207 via virtual link 211. As described below in more detail, virtualized device 207 may include circuitry configured to perform multiple functions, each of which may be accessed by separate Guest Operation Systems (GOS) being executed by processor 200, thereby allowing the hardware resources of virtualized I/O device 207 to be shared among multiple software resources. Transactions relayed to virtualized I/O device 207 via virtual link 211 may be encoded in accordance with any suitable protocol. In various embodiments, virtualized I/O device 207 may be fabricated on the same integrated circuit chip as cores 201a-b, cache partitions 202a-b, memory control unit 203, and communication unit 212. In such cases, virtual link 211 may not be limited by pin count, and may employ a multi-bit (parallel) data bus for improved communication speed and reliability.

Virtualized I/O device 207 is further coupled to transmission unit 208. In various embodiments, it may implement one or more network adaptor functions allowing virtualized I/O device 207 access to external device via a high-speed serial data link. For example, the transmission unit may implement EtherNet, InfiniBand, or any other suitable communications protocol.

It is noted that the embodiment illustrated in FIG. 2 is merely an example. In other embodiments, different devices, different numbers of cores, caches devices, and different configurations of cores, caches, and devices are possible and contemplated.

As mentioned above, hardware resources of a virtualized device may be shared between different threads or GOSs. Each thread or GOS sharing the hardware resources of the virtualized device may accesses different "virtual" functions performed the hardware resources of the virtualized device. To perform the actual transfer of data into and out of the virtualized device on behalf of the virtual function, the hardware resources of the virtualized device may implement multiple physical functions.

To manage the sharing of the hardware resources, additional circuitry may implement additional functions (commonly referred to as "conventional functions") that manage access to the hardware resources by allowing the reading and writing of control registers within the virtualized device. Tasks included in the conventional function may be isolated from the physical and virtual functions so that user code and device drivers that access the physical and virtual function are incapable of accessing or interfering with the control tasks.

Figure 3:
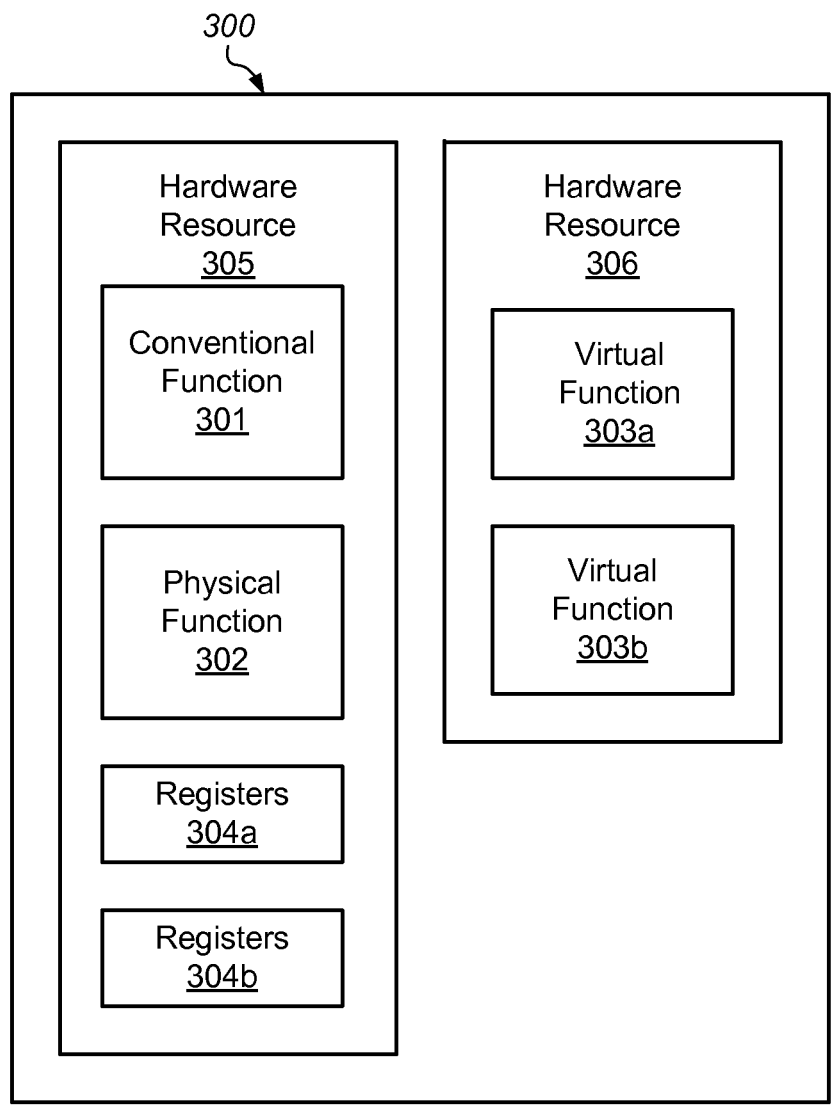
FIG. 3 is a block diagram of an embodiment of a virtualized device.

An embodiment of a virtualized device that is configured to implement multiple virtual functions is illustrated in FIG. 3. In various embodiments, virtualized device 300 may correspond to virtualized device 207 as illustrated in FIG. 2. In the illustrated embodiment, virtualized device 300 includes hardware resources 305 and 306. Hardware resource 305 may be configured to implement conventional function 301, and physical function 302. Additionally, hardware resource 305 includes registers 304a and 304b. Hardware resource 306 may be configured to implement virtual functions 303a-b, each of which may be mapped to separate GOSs or threads. In some embodiments, values stored in registers 304a and 304b may affect the operation of virtual functions 303a and 303b, respectively.

Hardware resources 305 and 306 may be implemented according to one of various design styles. For example, hardware resources 305 and 306 may be implemented using a dedicated sequential logic circuit or state machine. Alternatively, a general-purpose processor configured to execute software instructions may be used to implement either of hardware resources 305 and 306. Although two hardware resource blocks are depicted in the embodiment illustrated in FIG. 3, it is noted that, in some embodiments, any suitable number of hardware resource blocks, including a single hardware resource block, may be employed in a virtualized device.

In order to implement the tasks included in conventional function 301, hardware resource 305 may include an interface that allows access to control plane management functions within virtualized device 300. Such control plane functions include, without limitation, connections to on-chip networks, communication with a fabric manager, I/O link configuration and training, communication channel establishment, performance monitoring and tuning, and general housekeeping functions. It is noted that, in some embodiments, hardware resource 305 may only include basic circuitry, such as, e.g., control registers and status registers, collectively known as control status registers or CSRs (not shown), and that execution of commands associated with the control plane functions may be performed by a particular execution thread running on a processor or processor core, such as core 201*a*, for example.

By handling the control plane tasks of virtualized device 300 using an execution thread running on a processor core, hardware resource 305 may be simplified. Alternatively, or additionally, all communication, i.e., both control and data plane communication, to virtualized device 300 may be performed inband using existing communication capabilities thereby reducing a need for separate communication busses among the circuit blocks within an SoC. With reduced hardware and communication busses, pre-silicon verification and testing of the SoC may, in some embodiments, be simplified.

The execution of physical function 302 and virtual functions 303*a-b*, by hardware resources 305 and 306, collectively manage the transfer of data into and out of virtualized device 300 (commonly referred to as data plane functions). Such data plane functions may, in various embodiments, include management of user payload data stored in user-accessible queues, and encapsulation of such data into packets for transmission via an I/O link.

The data plane functions are accessed via software instructions running as part of an execution thread on a given processor or processor core. In various embodiments, the software instructions may be part of driver software (commonly referred to as a "device driver") for virtualized device 300. Physical function 302 and each of the virtual functions 303*a-b* may be mapped to a particular range of addresses within the address space of a computing system. The address range claimed by a particular virtual function may be set in a corresponding register. For example, the address range claimed by virtual function 303*a* may be programmed into registers 304*a* (also referred to herein as a "Base Address Register" or "BAR") during initialization. The distinction between physical function 302 and virtual functions 303*a-b* is made because certain operations performed in the virtualized device, such as, e.g., reporting I/O link errors or managing transaction-processing resources shared by all virtual functions, are executed by a version of the driver that comprehends all of the virtual functions. This version of the driver may manipulate resources for these tasks through physical function 302.

When software needs access to a particular physical or virtual function, such as, e.g., virtual functions 303*a-b*, Programmed I/O (PIO) reads or write instructions may be issued via the executing thread. As described below in more detail, a software layer existing between the hardware a particular GOS instance may prevent unauthorized access to a particular function. Access to the CSRs may also be limited for security reasons.

It is noted that the embodiment illustrated in FIG. 3 is merely an example. In other embodiments, different numbers of virtual functions, and different control mechanisms may be employed.

Figure 4:
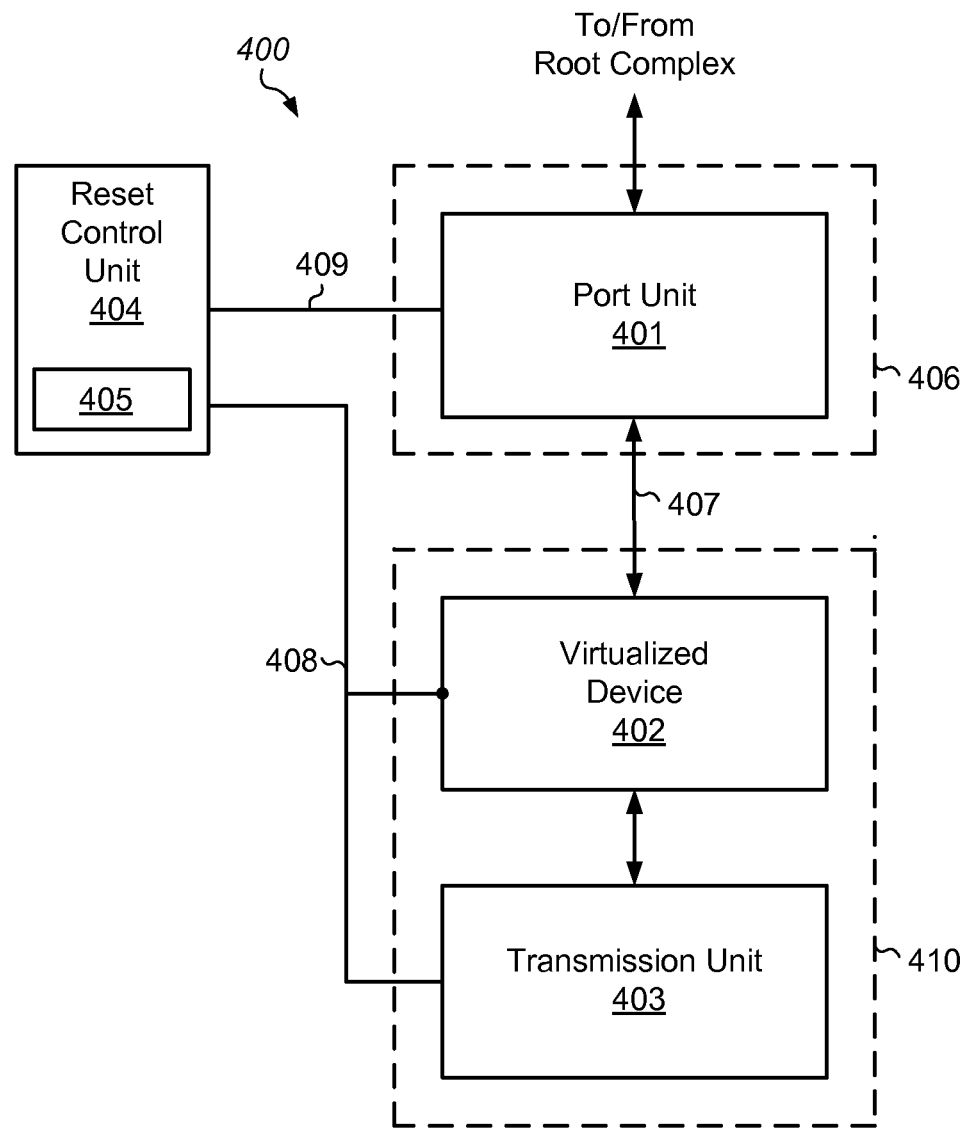
FIG. 4 is a block diagram illustrating reset regions within an Input/Output (I/O) subsystem.

Turning to FIG. 4, a block diagram of an I/O subsystem is illustrated. In the illustrated embodiment, I/O subsystem 400 includes port unit 401, virtualized device 402, reset control unit 404, and transmission unit 403. In various embodiments, port unit 401 may correspond to Root Port 206 of FIG. 2, virtualized 402 may correspond to virtualized I/O device 207 of FIG. 2, and transmission unit 403 may correspond to transmission unit 208 of FIG. 2. Port unit 401 is coupled to virtualized device 402 via virtual link 407.

Port unit 401 is included in reset region 406. Virtualized device 402 and transmission unit 403 are included in reset region 410. In various embodiments, each of reset regions 406 and 410 may be operated separately, thereby allowing only desired portions of I/O subsystem 400 to be reset. For example, in some cases, a processor or processor core coupled to I/O subsystem 400 may detect a request for hardware resources of virtualized 402 to be reallocated to a different GOS instance. In response to the detection, the processor may begin a series of operations that resets port unit 401. If it is determined that virtualized device 402 has been idle for a predetermined period of time, a reset for the units included in reset region 410 may not be performed. Alternatively, as will be described in more detail below in regard to FIG. 6, if virtualized device 402 is active, a reset of the units included reset region 410 may be performed, resetting the units to state equivalent to an initial state after a power-on reset.

Port unit 401 may be reset, in some embodiments, by the processor or processor core clearing a bit (i.e., writing the bit through a PIO request to a predetermined inactive value) in a register included in port unit 401 (not shown) that enables the virtual link. Once the bit has been cleared, transactions requests received from virtualized device 402 may be disregarded or otherwise ignored, such that they do not propagate beyond port unit 401 to the processor cores and cache/memory subsystem. Additionally, values of other registers bits may be altered to prevent port unit 401 from accepting further PIO requests from a processor or processor core. In such cases, upon receiving such a PIO request, port unit 401 may response to the processor or processor core with a predetermined error message.

Virtualized device 402 and transmission unit 403 may be reset by the assertion of reset signal 408. In response to the assertion of reset signal 408, CSR registers included in virtualized device 402 and transmission unit 403 (not shown) may be set to a default value. State machines or other sequential logic circuits included in virtualized device 402 and transmission unit 403 (also not shown) may be set to a predetermined state. In various embodiments, after the reset process has completed, virtualized device 402 and transmission unit 403 may be in a state equivalent to a state after a power-on reset of the computing system.

In cases when a reset of virtualized device 402 and transmission unit 403 is not desired, but port unit 401 is to be reset, various register values included within virtualized device 402 that govern the conventional function, the physical function, and the multiple virtual functions included in virtualized device 402, may be modified. The modified values may prevent virtualized device 402 from issuing new Direct Memory Access (DMA) requests while the reset is being performed on port unit 401.

Reset control unit 404 includes registers 406 and may be designed according to one of various design styles. In some embodiments, reset control unit 404 may include multiple logic gates arranged to implement a desired function. Reset control unit 404 may, in other embodiments, employ one or more sequential logic circuits or state machines in order to implement the desired function. Registers 406 may store various values relating to the configuration and status of reset control unit 404.

During operation, reset control unit 404 may receive PIO requests from a processor or processor core. Such requests may be the result of the processor or processor core detecting, through an interrupt or sideband signaling mechanism, a reset condition for virtualized device 402. The received PIO requests may be to store one or more values into register 405. In some embodiments, modifying a value in registers 405 may assert or de-assert reset signals 408 and/or 409. Reset signal 409 may be used, in various embodiments, for relaying a global reset signal from a computing system in which I/O subsystem 400 is included. Further, some embodiments may provide a reset line driven by port unit 401 to virtualized device 402 (not shown) to propagate the global reset to virtualized device 402 and transmission unit 403.

During a reset operation, the processor or processor core may periodically check (or poll) status registers included in port unit 401 to determine a status of pending PIO requests. Additionally, a status of pending DMA requests may also be determined in a similar fashion. Once all pending PIO and DMA requests have completed, the processor or processor core may set a register bit in port unit 401 that initiates a reset within port unit 401.

It is noted that the embodiment illustrated in FIG. 4 is merely an example. In other embodiments, different numbers of ports and virtualized devices, and different arrangements of ports and virtualized devices may be employed.

Figure 5:
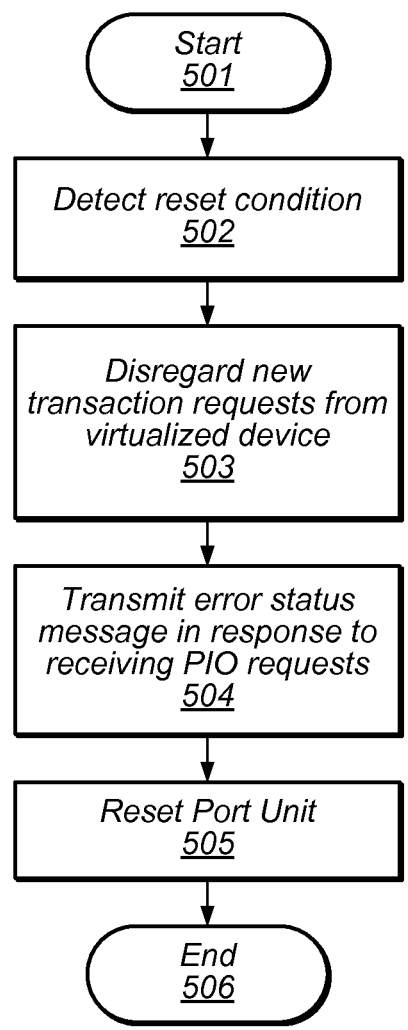
FIG. 5 illustrates a flow diagram depicting an embodiment of a method for performing a first type of reset for a virtualized device.

Turning to FIG. 5, a flow diagram depicting an embodiment of a method for resetting a virtualized device is illustrated. Referring collectively to the embodiment illustrated in FIG. 4, and the flow diagram of FIG. 5, the method begins in block 501.

A reset condition may then be detected (block 502). In various embodiments, a request for reallocating hardware resource associated with virtualized device 402 that are currently allocated to a given GOS instance to a different GOS instance may be detected through software communication channels. In the present embodiment, it may be determined that only port unit 401 needs to reset as virtualized device 402 may be in a state where its hardware resources may be reallocated without a reset.

Port unit 401 may then disregard new transaction requests from virtualized device 402 (block 503). Such transactions may include DMA requests, MSI-X interrupts, and PCIe messages. In some embodiments, a register bit may be set by a processor or processor core to inhibit port unit 401 from propagating new transactions transmitted by virtualized device 402.

In a similar fashion, port unit 401 may, when operating with the reset condition active, transmit predetermined error status messages in response to receiving PIO requests from the processor or processor core (block 504). Port unit 401 may then be reset (block 505). In various embodiments, a different register bit value may be set to initiate the reset. Prior to initiating the reset, pending DMA and PIO requests may be tracked and allowed to complete. The method may then conclude in block 506.

It is noted that the method depicted in the flow diagram of FIG. 5 is merely an example. In other embodiments, different operations and different orders of operations are possible and contemplated.

Figure 6:
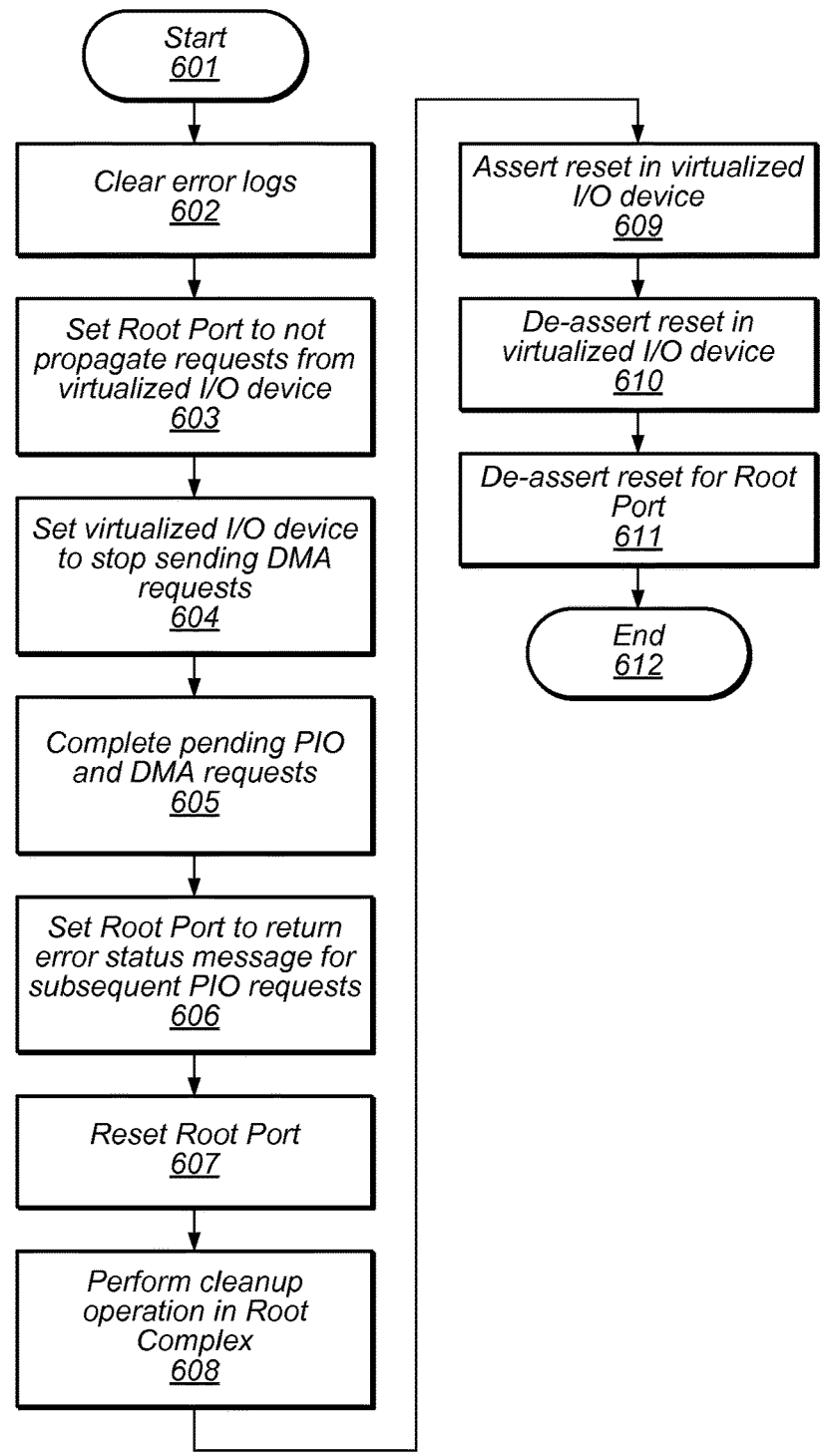
FIG. 6 illustrates a flow diagram depicting a method for performing a second type of reset for a virtualized device.

A flow diagram depicting an embodiment of another method for resetting a virtualized device is illustrated in FIG. 6. Referring collectively to the embodiment depicted in FIG. 2 and the flow diagram of FIG. 6, the method begins in block 601. In response to detecting a reset condition for virtualized I/O device 207, error logs included in Root Complex 204 may be cleared (block 602). In other embodiments, an error mask within Root Port 206 may also be enabled to prevent spurious errors as the reset operation proceeds. It is noted that the reset condition may be the result of one of core 201*a-b* detecting an error in virtualized I/O device 207, or a request to re-allocate hardware resources of virtualized I/O device 207 from one GOS instance to another GOS instance.

Root Port 206 may then be instructed to disregard and not propagate transactions requests from virtualized I/O device 207 (block 603). In some embodiments, a Bus Master enable bit included within a command register of Root Port 206 may be cleared to instruct Root Port 206 to disregard the requests.

Virtualized I/O device 207 may then be instructed to stop sending DMA requests (block 604). In various embodiments, a Bus Master enable bit included in a CSR of virtualized I/O device 207 may be set to a predetermined value to prevent virtualized I/O device 207 from issuing new DMA requests. Pending DMA and PIO requests may then be completed (block 605). CSRs in Root Port 206 may, in some embodiments, contain status information regarding pending PIO and DMA requests. One or cores 201*a-b* may repeatedly check these registers (also referred to herein as "polling") to determine when all pending PIO and DMA requests have completed.

When all pending PIO and DMA requests have completed, Root Port 206 may then be instructed to respond to subsequent PIO requests with an error status message (block 606). In some embodiments, one or more registers bits may be set to enable this particular function. Root Port 206 may then be reset (block 607). A reset signal internal to Root Port 206 may be activated, in some embodiments, by setting a control bit to a predetermined value. For example, in the case of a PCIe-based I/O subsystem, a logical-1 value may be written into Secondary Bus Reset bit included in a Type 1 Configuration Space Header's Interrupt and Bridge Control Register included in Root Port 206.

Cleanup operations may then be performed in Root Complex 204 (block 608). In various embodiments, such cleanup operations may include clearing error status registers, invalidating address translation caches, and the like. A reset signal for virtualized I/O device 207 may then be asserted (block 609). In various embodiments, a Reset Control Unit, such as, e.g., Reset Control Unit 404, may assert the reset signal in response to one or more bits included in the Reset Control Unit's CSRs being set, by the processor executing PIO write transactions, to a predetermined value.

Once virtualized I/O device 207 has reset, the reset signal may then be de-asserted (block 610). It is noted that following such a reset, virtualized I/O device 207 may be in a state similar to a state after a power-on reset of the device. In a similar fashion to the assertion of the reset signal, the one or more bits included in the Reset Control Unit's CSRs may be set to new values, resulting in the de-assertion of the reset signal. The reset for Root Port 206 may then be de-asserted (block 611). In various embodiments, the Secondary Bus Reset bit may be re-written in order to de-assert the reset. The method may then conclude in block 612.

Although the operations of the method illustrated in FIG. 6 are depicted as being performed in a sequential fashion, in other embodiments, one or more of the depicted operations may be performed in parallel.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a first device;
   a communication unit including a first port circuit, wherein the first port circuit is coupled to the first device via a first link; and
   a processor configured to detect a reset condition for the first device, wherein the reset condition includes a request to reallocate a resource of the first device;
   wherein the first port circuit is configured to:
      send one or more first instructions to the first device via the first link using a first communication protocol; and
      in response to a detection of the reset condition:
         disregard one or more transaction requests made by the first device;
         check pending Programmed Input/Output (PIO) transactions; and
         after the pending PIO transactions have completed, send an error message to the processor, in response to receiving another PIO request from the processor.

2. The apparatus of claim 1, further comprising a reset control block configured to assert a reset signal, and wherein the first device is configured to reset in response to an assertion of the reset signal.

3. The apparatus of claim 2, wherein the first device includes at least one register, and wherein to reset in response to the assertion of the reset signal, the first device is further configured to set the at least one register to a default value.

4. The apparatus of claim 2, wherein the reset control block includes a plurality of registers, and wherein to assert the reset signal, the reset control block is further configured to write a predetermined value into at least one of the plurality of registers in response to a PIO request from the processor.

5. The apparatus of claim 1, wherein the communication unit includes a plurality of registers, and wherein a value of at least one of the plurality of registers enables an error log, wherein the communication unit is configured to clear the value of the at least one of the plurality of registers in response to the detection of the reset condition.

6. The apparatus of claim 1, further comprising a second device coupled to a second port included in the communication unit by a second link, wherein the second port is configured to send one or more second instructions to the second device via the second link using a second communication protocol different than the first communication protocol.

7. A method, comprising:
   detecting a reset condition for a first device, wherein the reset condition includes a request to reallocated a resource of the first device;
   transmitting, by a first port circuit of a communication unit, one or more first instructions to the first device via a first communication protocol via a first link; and
   in response to detecting the reset condition:
      disregarding, by a first port circuit of a communication unit, one or more transactions request made by the first device;
      checking pending Programmed Input/Output (PIO) transactions; and
      after the pending PIO transactions have completed, sending an error message by the first port circuit to a processor, in response to receiving another PIO request from the processor.

8. The method of claim 7, further comprising:
   asserting a reset signal by a reset control unit; and
   resetting the first device in response to asserting the reset signal.

9. The method of claim 8, further comprising de-asserting the reset signal by the reset control unit in response to determining the first device has been reset.

10. The method of claim 7, wherein detecting the reset condition for the first device includes detecting an error in the first device.

11. The method of claim 7, wherein detecting the reset condition for the first device includes detecting a request to transfer resources of the first device from a first Guest Operating System (GOS) to a second GOS.

12. The method of claim 7, wherein disregarding, by the first port circuit of the communication unit, the one or more transactions request made by the first device in response to detecting the reset condition includes clearing a value in at least one register of a plurality of registers included in the first port circuit to disable propagation of requests sent by the first device.

13. The method of claim 7, further comprising transmitting one or more second instructions to a second device by a second port of the communication unit via a second link using a second communication protocol, wherein the second communication protocol is different than the first communication protocol.

14. A system, comprising:
   a plurality of processors, wherein a first processor of the plurality of processors is configured to execute a first plurality of software instructions included in a first guest operating system (GOS), and wherein a second processor of the plurality of processors is configured to execute a second plurality of software instructions included in a second GOS;
   a first device;
   a second device; and a communication unit including a first port circuit and a second port circuit, wherein the first port circuit is coupled to the first device via a first link and the second port circuit is coupled to the second device via a second link;

wherein the first processor is configured to detect a reset condition for the first device, wherein the reset condition includes a request to reallocate a resource of the first device;

wherein the first port circuit is configured to:
 transmit at least a first command via the first link using a first communication protocol to the first device in response to an execution of at least a first instruction of the first plurality of software instructions;
 in response to a detection of the reset condition:
  disregard one or more transaction requests made by the first device;
  check pending Programmed Input/Output (PIO) transactions; and
  after the pending PIO transactions have completed, send an error message to the first processor in response to receiving another PIO request from the first processor.

15. The system of claim 14, further comprising a reset control unit configured to assert a reset signal, and wherein the first device is further configured to reset in response to an assertion of the reset signal.

16. The system of claim 15, wherein the reset control unit is further configured to de-assert the reset signal in response to a determination that the first device has been reset.

17. The system of claim 14, wherein to detect the reset condition for the first device, the first processor is further configured to detect an error in the first device in response to an interrupt or sideband signal.

18. The system of claim 14, wherein to detect the reset condition for the first device, the first processor is further configured to detect a software request to transfer resources of the first device from the first guest operating system to a different guest operating system.

19. The system of claim 14, wherein to detect the reset condition for the first device, the first processor is further configured to transmit a PIO request to the first port circuit, wherein the PIO request includes a request to clear a value in a register included in the first port circuit.

20. The system of claim 14, wherein the second port circuit is configured to transmit at least a second command via the second link using a second communication protocol to the second device in response to an execution of at least a second instruction of the second plurality of software instructions, wherein the second communication protocol is different than the first communication protocol.

* * * * *